10/13/87 OR 4,699,223

United States Patent [19] | [11] Patent Number: 4,699,223
Norén | [45] Date of Patent: Oct. 13, 1987

[54] METHOD AND DEVICE FOR PERCUSSION EARTH DRILLING

[75] Inventor: John P. Norén, Vallentuna, Sweden

[73] Assignee: Stabilator AB, Danderyd, Sweden

[21] Appl. No.: 928,661

[22] Filed: Nov. 6, 1986

Related U.S. Application Data

[63] Continuation of Ser. No. 876,297, Jun. 18, 1986, abandoned, which is a continuation of Ser. No. 574,146, Jan. 26, 1984, abandoned.

[30] Foreign Application Priority Data

Jan. 26, 1983 [SE] Sweden ............ 8300390

[51] Int. Cl.4 ............ E21B 44/00; E21B 4/14; B23Q 5/033; E21C 3/04

[52] U.S. Cl. ............ 175/40; 175/296; 173/10; 173/20; 173/21; 91/392

[58] Field of Search ............ 175/19, 26, 40, 135, 175/296; 173/10, 11, 14, 20, 21, 4, 105, 112, 115, 116; 91/392

[56] References Cited

U.S. PATENT DOCUMENTS

| | | | |
|---|---|---|---|
| 3,154,158 | 10/1964 | Lincoln | 175/135 |
| 3,721,095 | 3/1973 | Chelminski | 175/19 |
| 3,780,814 | 12/1973 | Herb | 173/115 |
| 3,995,700 | 12/1976 | Mayer et al. | 173/115 |
| 4,006,783 | 2/1977 | Granholm | 173/105 |
| 4,227,442 | 10/1980 | Oguni et al. | 91/392 |
| 4,429,751 | 2/1984 | Jackson et al. | 173/116 |

FOREIGN PATENT DOCUMENTS

| | | | |
|---|---|---|---|
| 2213315 | 3/1979 | Fed. Rep. of Germany | 173/21 |
| 891903 | 12/1981 | U.S.S.R. | 173/116 |

*Primary Examiner*—Stephen J. Novosad
*Assistant Examiner*—Bruce M. Kisliuk
*Attorney, Agent, or Firm*—Cushman, Darby & Cushman

[57] ABSTRACT

In percussion drilling such as earth drilling, a hammer piston driven by pressure medium is axially reciprocally movable in a drill body to transfer impact energy to a drill shank connectable to a drill bit. The axial position of the drill shank in the drill body is monitored, and the impact energy of the hammer piston is varied as a function of said position. For this purpose a sensor in the drill body produces a signal corresponding to the axial position of the drill shank in the drill body. By means of a control valve, the signal is used to control the pressure of the pressure medium actuating the hammer piston, thereby varying the impact energy.

20 Claims, 5 Drawing Figures

METHOD AND DEVICE FOR PERCUSSION EARTH DRILLING

Figure 1:
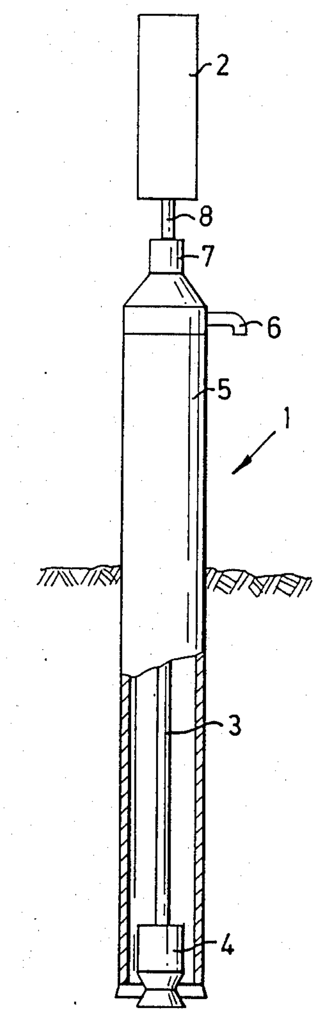

This is a continuation of application Ser. No. 876,297, filed June 18, 1986, now abandoned, which is a continuation of application Ser. No. 574,146, filed Jan. 26, 1984, now abandoned.

The invention relates to a method for percussion drilling, particularly earth drilling, whereby a hammer piston driven by pressure medium is axially reciprocally movable in a drill body, to transfer impact energy to a drill shank which is axially movable in the same drill body, is connectable to a drill bit, and has, in the drill body, a normal operating position in which it is subjected to an axial feed force in the drilling direction. The invention also relates to a device for percussion drilling.

For earth drilling, percussion drilling equipment is usually used whereby the actual drilling machine is placed above the earth and one or more drilling rods transfer the impact energy to the drill bit down in the bore hole. Between each impact, the bit is turned through a certain angle. In order to achieve effective use of the impact energy applied, one tries to apply a feed force which is large enough to produce good contact in all the joints in the drilling equipment, at the same time as the drill bit is pressed against the bottom of the bore. Depending on the type of earth, the drill bit will, however, encounter different amounts of resistance at different depths, and this makes effective drilling considerably more difficult. Attempts have therefore been made to achieve more effective drilling by, instead of using preset combinations of impact energy, turning and feeding, varying one or more of these variables during drilling. In manually controlled drilling, it has thus been possible, depending on the skill of the operator, to achieve certain improvements, but the life of the drilling equipment has still proved often to be much too short.

Attempts have also been made to automate the drilling by synchronizing feeding and turning in various ways, i.e. by making the feed dependent on torque, decreasing the feed as torque increases, or by making the feed dependent on the rotational speed, decreasing the speed as the rotational speed decreases. The impact energy applied has in these cases been held constant. Variable feed has however caused problems with the flushing since it is always necessary to be able to flush out dislodged material, even at a high rate of feed. This solution has proved to be rather unsatisfactory, and the problem of rapid wear of the drilling equipment has remained.

In percussion drilling, the hammer piston creates shock waves which are to be passed to the material being drilled. The energy which is not used in the drilling work is reflected back to the drilling machine. This reflected amount of energy can in certain cases be so great as to cause serious damage to the drilling machine. There is a great risk of damage for example when drilling through a hard material to a loose material, and the drill bit suddenly no longer encounters resistance from underlying material.

The purpose of the invention is to achieve a method and a device for drilling which reduces the risk of damage to the equipment over what has been possible up to now, and makes more effective drilling possible.

This is achieved according to the invention by monitoring the axial position of the drill shank in the drill body, and by varying the impact energy of the hammer piston as a function of said position. It is particularly suitable in this case that reduction of the impact energy be initiated when the drill shank has been displaced from its normal operating position in the drill body, and that the reduction continue until the drill shank has returned to its normal operating position. By thus adapting the impact energy to the type of underlying material, effective drilling is made possible whereby cooperating components can always assume a correct operating position relative to each other.

A device according to the invention for percussion drilling, with a pressure medium-driven hammer piston which reciprocates in a drill body and is arranged to transmit impact energy to a drill shank which is axially movable in the same drill body and is connectable to a drill bit, said shank being arranged to be able to be subjected, by means of the drill body, to feed force in the drilling direction, is characterized in that the drill body is provided with a sensor which is arranged to emit a signal corresponding to the axial position of the drill shank in the drill body and that in a line for supplying driving medium to the hammer piston there is a control valve by means of which the pressure of the driving medium, and thereby the impact energy, can be changed as a function of said signal.

Figure 3:
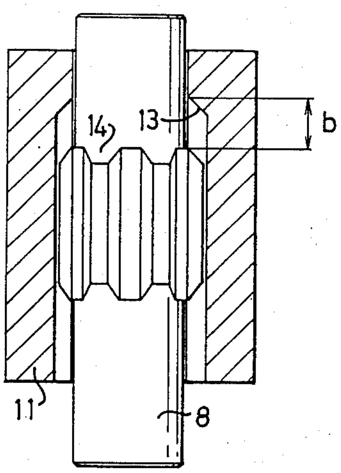
Figure 2:
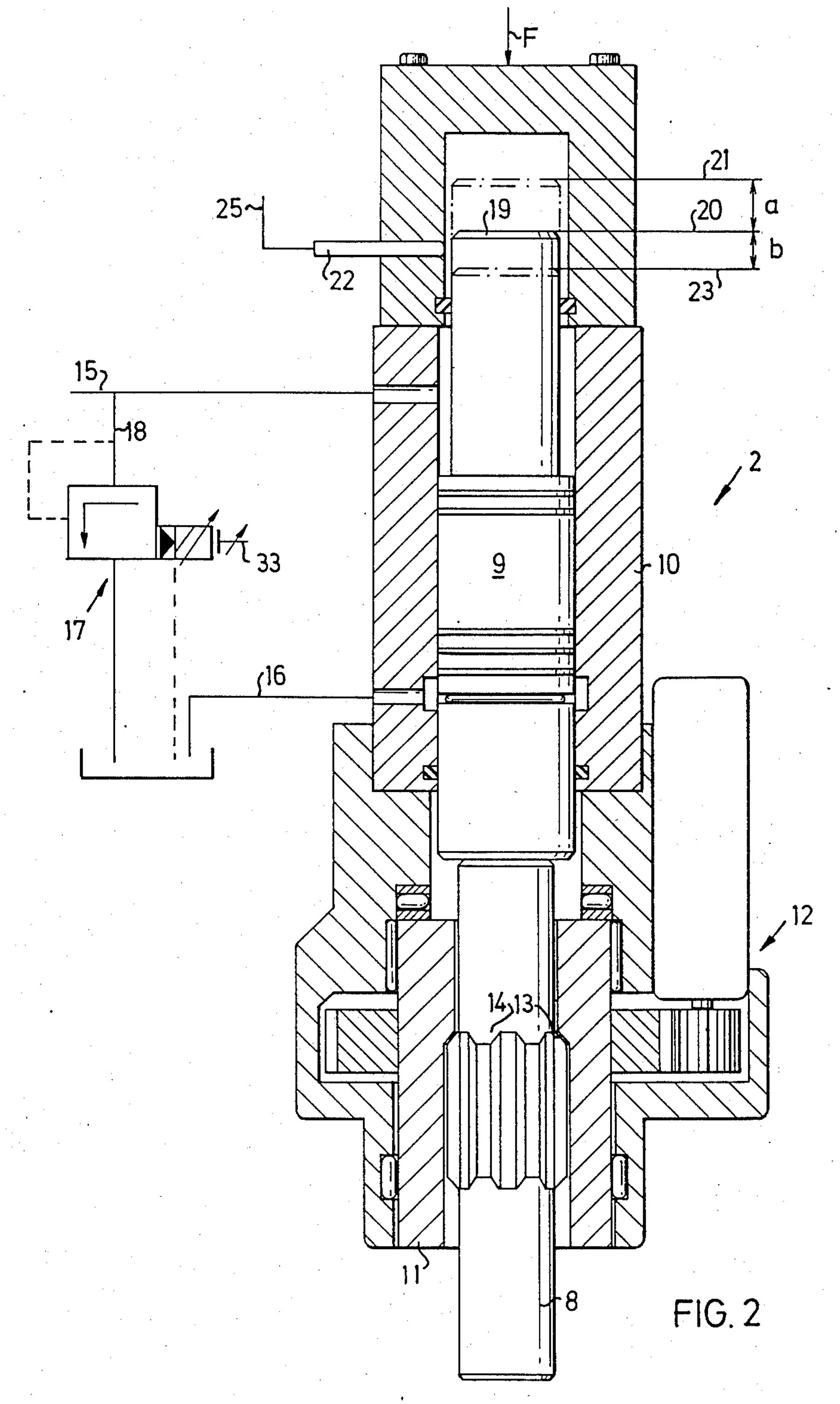
Figure 4:
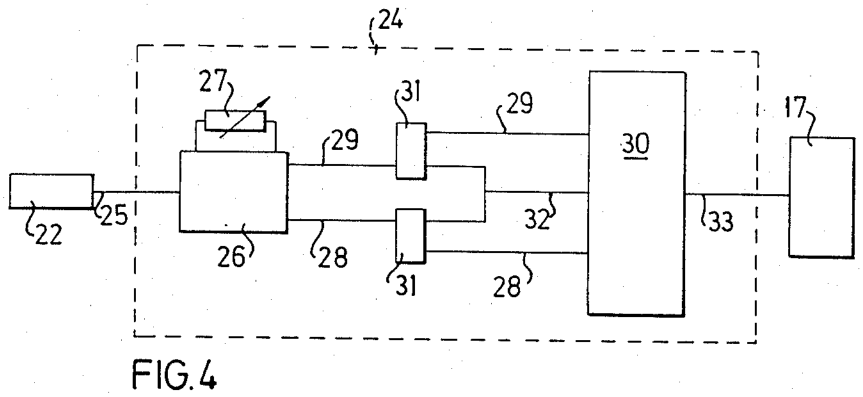
Figure 5:
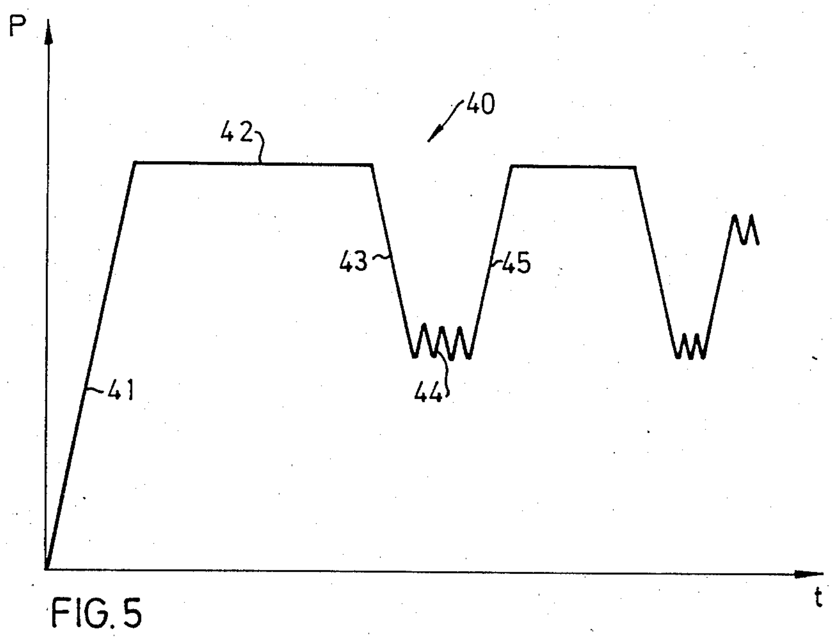

The invention will be explained below, in more detail with the aid of an example shown in the accompanying drawing, in which FIG. 1 shows schematically earth-drilling equipment, FIG. 2 shows a device according to the invention, FIG. 3 shows the drill shank and the turning sleeve in a different relative position than in FIG. 2, FIG. 4 shows how the sensor and the control valve are coupled to each other, and FIG. 5 shows schematically how the driving pressure can vary as a function of time.

FIG. 1 shows an earth-drilling unit 1, in which a driving device 2 in the form of a hammer mechanism is arranged to transmit, via a drill rod 3, impact energy to a drill bit 4. The bore hole is kept open with the aid of a liner tube 5, by means of which dislodged particles are transported up to an exhaust 6. The drill rod 3 can be divided into several parts, which are connected in a conventional manner by connecting sleeves. The drill rod 3 is connected at the top, via a connector 7, to a drill shank 8 in the drive means 2.

The details of the drive means 2 are revealed in FIG. 2. The drive means 2 consists of a conventional percussion drill mechanism, in which a hammer piston 9 moves reciprocally in a drill body 10 in order to transmit impact energy to the drill shank 8. The drill body 10 includes a turning sleeve 11, which can be rotated with the aid of a turning means 12. The turning sleeve 11 and the drill shank 8 are nonrotatably engaged to each other with the aid of splines for example. The drill shank 8 is to a certain extent axially movable in the turning sleeve 11. In the position shown in FIG. 2 the turning sleeve 11 rests on the drill shank 8 with the aid of a surrounding abutment 13 which is in contact with a corresponding abutment 14 on the drill shank. The drill shank 8 can thereby be subjected to a feed force F acting on the drill body 10 in the drilling direction.

Pressure medium for driving the hammer piston 9 is supplied via a line 15 and is removed via a return line 16. A control valve 17 is connected via a line 18 to the line 15. The control valve 17 is in this case a proportional pressure-limiting valve which makes it possible to vary the pressure of the pressure medium acting on hammer piston 9.

In normal operation, when the abutment 13 in the sleeve 11 is in contact with the abutment 14 on the drill shank 8, the upper end 19 of the hammer piston 9 has a normal lower end position 20 and a normal upper end position 21, which are spaced apart a distance a. Just below the lower end position 20, there is a sensor 22 mounted in the drill body 10. The sensor 22 senses whether the hammer piston 9 is operating between its normal end positions.

In normal drilling through rock for example, the drill shank 8 is subjected via the turning sleeve 11 to a feed force F, at the same time as the hammer piston 9 operates between its normal end positions 20 and 21 and acts on the drill shank 8. There is no substantial relative movement between the drill shank 8 and the turning sleeve 11. If there is a sudden transition to a softer material, the driving pressure will suffice to provide a longer movement of the hammer piston 9 than previously. The hammer piston will now have an abnormally low end position 23, located a distance b below the normal lower end position 20. As a result of the fact that the feed does not have time to catch up, a corresponding axial play b will thereby be created between the abutments on the drill shank 8 and the turning sleeve 11 (see FIG. 3). The size of this play will vary with each impact. Since all the impact energy can not in this case be used at the drill bit, impact energy will be reflected back, also imparting an upwardly directed return movement to drill shank 8. The reflected impact energy can give rise to appreciable damage. The relative axial movement between the drill shank and the turning sleeve can, as a result of frictional forces, result in the components fusing together, thus causing a breakdown. It is obvious that time is in this case an essential factor, since the risk of damage is apparently increased if the abnormal operating state is lengthy. The impact energy which the hammer piston 9 can transmit is apparently dependent on the pressure of the pressure medium supplied in the line 15. Limiting the pressure can also limit the impact energy.

FIG. 4 shcws how the sensor 22 can be used to automatically control the control valve 17 via a control means 24. The sensor 22 is made as an inductive limit switch and is connected via a wire 25 to a monostable multivibrator 26, which has a pulse time which is adjustable with the aid of a potentiometer 27. Wires 28 and 29 are connected to a first and a second output respectively, on the monostable multivibrator 26 and connect it to a standard chopper amplifier 30 designed for one-solenoid proportional valves. A branch 31 is coupled into each of the wires 28 and 29 and are connected via a common wire 32 to the amplifier 30, which is in turn connected via a wire 33 to the control value 17, in this case an electrical proportional pressure-limiting valve. It is possible to set the amplifier 30 for optimum operating parameters, e.g. maximum and minimum values for current to the solenoid. The acceleration and retardation times for the current to the solenoid can also be controlled.

When the hammer piston 9 operates in its normal position, the signal from the sensor 22 is such that the monostable multivibrator 26 produces a signal only at its first output. The maximum value potentiometer in the amplifier 30 is thus engaged via the wire 28. The control current to the control valve 17 will thereby increase continuously up to a set maximum value. This corresponds to the section 41 of the curve 40 (shown in FIG. 5) of the variation in pressure as a function of time. The maximum pressure is then maintained as long as the hammer piston 9 operates within its normal range (curve section 42). If the underlying material should suddenly become less hard, the hammer piston 9 will reverse at a position below its normal lower end position 30, and the signal from the sensor 22 will be changed. This will make the monostable multivibrator 26 switch, so that a signal will only be produced at the second output. The minimum potentiometer in the amplifier 30 will now be engaged, and the control current to the control valve 17 will consequently begin to be reduced, resulting in a drop in pressure as shown by the curve section 43 shown in FIG. 5. If the monostable multivibrator 26 after a certain period of time, e.g. about 30 ms, is still receiving the same type of signal from the sensor 22, it will still produce only an output signal from the second output, and the drop in pressure will continue, possibly until the set minimum value has been reached. If, however, the hammer piston 9, as a result of the drop in pressure, will again be operating within its normal range, the signal from the sensor 22 will change its character, so that the monostable multivibrator 26 will switch and again generate a signal only from the first output, via the wire 28 to the amplifier 30 thereby initiating an increase in pressure. The underlying material can, however, be such that no major change in pressure is possible without the hammer piston 9 leaving its normal operating range. The curve section 44 in FIG. 5 represents such a state, in which relatively small increases in pressure alternate with relatively small decreases in pressure in a sort of equilibrium. When a harder material is struck, an increase in pressure will again occur (curve section 45). In this manner, the size of the driving pressure, i.e. the size of the impact energy, can be'continually adjusted to the material being drilled at that particular time.

A common frequency for the hammer piston 9 is about 50 Hz. The driving pressure at a flow of 75 liters/-minute for example, can be varied between a maximum value of about 175 bar and a minimum value of about 80 bar, but these values are of course variable, depending on which type of equipment is used and the working conditions.

As was seen above, the lower end position of the upper end 19 of the hammer piston 9 is used as a reference for the axial position of the drill shank 8 in the turning sleeve 11, since this has proved to be a simple and reliable method.

It is of course also possible to use other types of sensors and other placements of the sensor than that shown in FIG. 2 to determine whether the drill shank 8 has the correct operating position in the turning sleeve 11. One conceivable solution is to place a suitable sensor at the lower end of the hammer piston 9, to sense its lower end position. The hammer piston 9 can possibly be provided with some means to simplify indicating the operating position of the piston. Some form of mechanical sensor can possibly be used to indicate the piston position, but then it would most likely be necessary to connect the sensor to some form of electronic circuit which would pay attention to the impact frequency but filter out other vibrations so as to produce an indication which is as reliable as possible.

What I claim is:

1. A method of percussion drilling, particularly earth drilling, comprising: reciprocating a hammer piston in a drill body so as to transfer impact energy to a drill shank axially movable in the drill body and connectible to a drill bit, monitoring the axial position of the drill shank in the drill body, and regulating the impact energy of the hammer piston in response to said position.

2. A method as in claim 1, wherein the axial position of the drill shank is monitored indirectly, by monitoring the axial position of the hammar piston.

3. A method as in claim 1, wherein, when detecting a displacement of the drill shank from a normal to an unnormal work position, a reduction of the impact energy is initiated.

4. A method as in claim 3, wherein a reduced impact energy level is allowed to prevail long enough for the drill shank to return to its normal work position, and wherein, upon detection of the return of the drill shank to its normal work position, the impact energy is allowed to increase.

5. A method as in claim 4, wherein the impact energy increase is discontinued at a predetermined maximum level, while the drill shank is still in its normal work position.

6. A method as in claim 1, wherein the impact energy is regulated by regulating the pressure of a pressure medium driving the hammer piston.

7. A method as in claim 1, wherein the axial position of the drill shank is monitored inductively.

8. A method as in claim 7, wherein the drill shank position is monitored via the hammer piston position.

9. A device for percussion drilling, particularly earth drilling, comprising a drill body, a pressure medium-driven hammer piston reciprocable within the drill body, a drill shank connectible to a drill bit and axially movable in the drill body and receiving impact energy from the hammer piston, a sensor for detecting the position of the drill shank, said sensor being connected to a regulating device for regulating the impact energy of the hammer piston in response to the hammer piston position detected by said sensor.

10. A device as in claim 9, wherein said regulating device comprises a control valve regulating the pressure of fluid driving the hammer piston in response to signals from the sensor.

11. A device as in claim 10, wherein the control valve is a proportional pressure-limiting valve.

12. A device as in claim 9, wherein the sensor is mounted in the drill body, at the normal lower end position for the upper end of the hammer piston, and is of the inductive type.

13. Method of percussion drilling, particularly earth drilling, whereby a hammer piston driven by pressure medium is axially reciprocally movable in a drill body to transfer impact energy to a drill shank which is axially movable in the drill body, the drill shank being connected to a drill bit and having normal upper and lower axial operating positions and which by means of the drill body is subjected to an axial feed force in the drilling direction, the method comprising monitoring the axial position of the drill shank in the drill body, detecting a displacement of the drill shank from its normal operating position to an unnormal work position whereby the shank by means of the drill body is not subject to said axial feed force in the drilling direction, initiating a reduction of the impact energy of the hammer piston achieving said reduction by reducing the pressure of the driving nedium supplied, and making said reduction large enough to allow the drill shank to return to its normal operating positions, and initiating, upon detection of the return of the drill shank to its normal work position, an impact energy increase by increasing the driving medium pressure.

14. Method according to claim 13, wherein the impact energy increase is discontinued, while the drill shank remains in its normal operating position, at a predetermined maximum level.

15. Method according to claim 13, characterized in that the impact energy is varied by varying the pressure of the driving medium.

16. Method according to claim 13, characterized in that the axial position of the drill shank is monitored inductively.

17. Device for percussion drilling, particularly earth drilling, comprising a drill body; a pressure medium-driven hammer-piston reciprocable within the drill body, a drill shank axially movable in the drill body, the hammer piston and drill shaft being arranged such that impact energy is transferred from the hammer piston to the drill shaft; a drill bit connected to one end of the drill shaft, said drill shank having an upper and lower extreme position defining a normal work position; a means to provide a feed force to the drill body; a sensor for detecting the position of the drill shank, said sensor being connected to a control device to operate a control valve, said valve regulating the flow of fluid to the hammer-piston by a supply line; said sensor capable of producing a first signal corresponding to the position of the shank when the shank is not in the normal work position, said signal effecting the control valve to reduce the impact energy to a level at which the drill shank returns to the normal work position, the sensor further being capable of producing a second signal indicating the drill shank being in the normal work position, said second signal causing an increase in the pressure medium to a predetermined level.

18. Device according to claim 17, characterized in that the sensor is mounted in the drill body, at the normal lower end position for the upper end of the hammer piston, and is of the inductive type.

19. Device according to claim 17, characterized in that the sensor is coupled to a control device for controlling the control valve, which is preferably a proportional pressure-limiting valve.

20. Device according to claim 19, characterized in that the control device is arranged, when the hammer piston moves within its normal working range, to adjust the control valve so that the impact energy increases continuously up to a predetermined maximum level.

* * * * *